Figure 1:
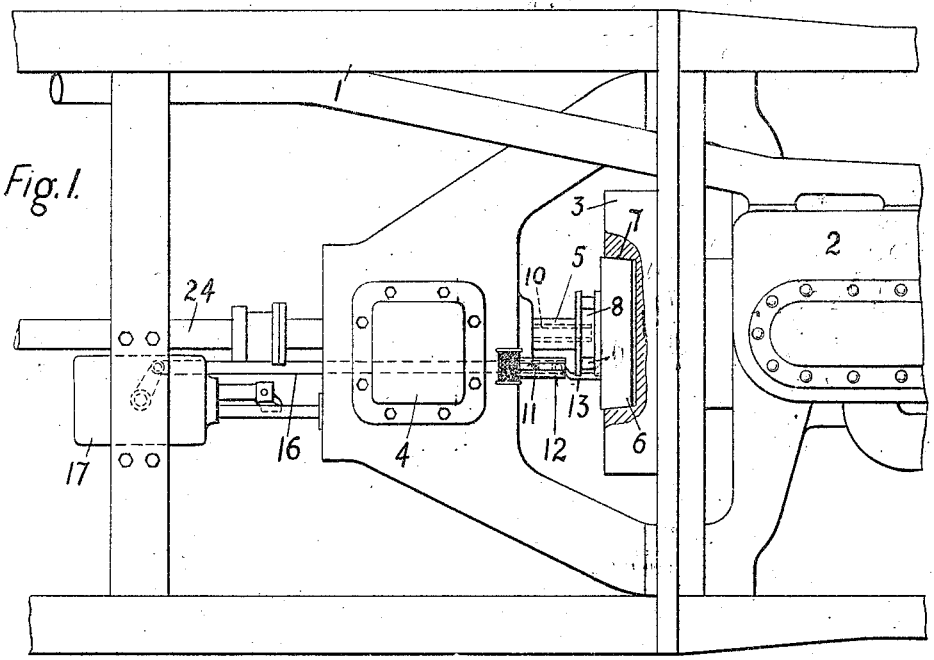

F. CONRAD.
GEAR SHIFTING MECHANISM.
APPLICATION FILED JAN. 30, 1914. RENEWED MAY 16, 1917.

1,296,483.

Patented Mar. 4, 1919.
3 SHEETS—SHEET 1.

WITNESSES:
M. A. Schubeler
J. R. Langley

INVENTOR
Frank Conrad
BY
Wesley G. Carr
ATTORNEY

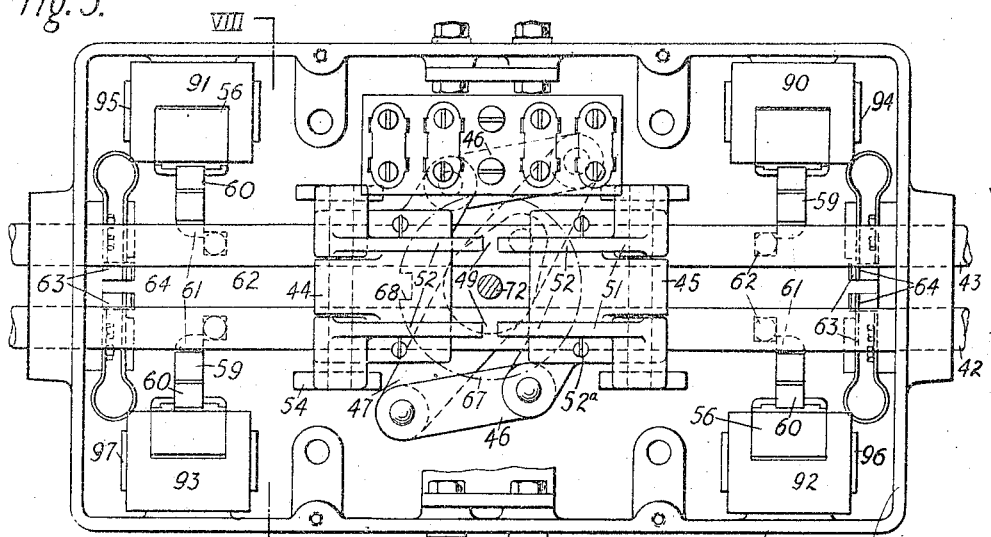
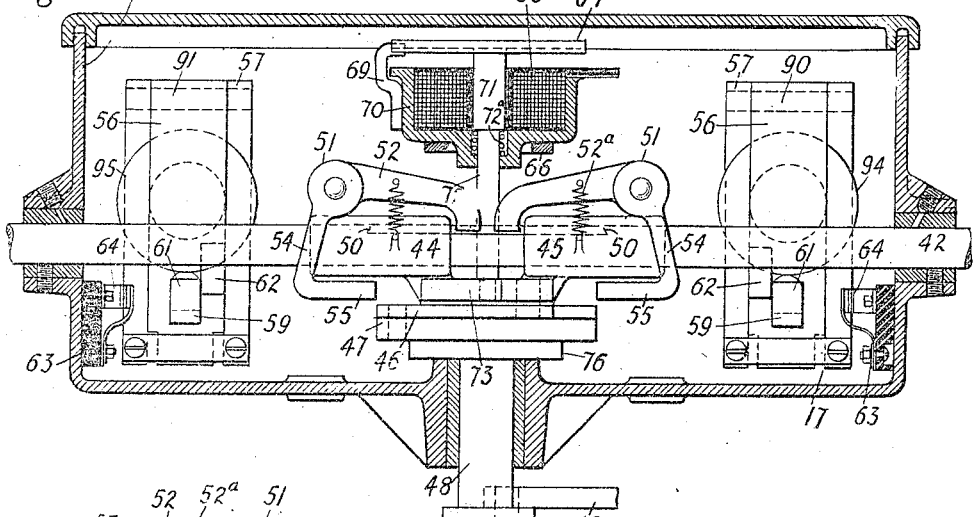

F. CONRAD.
GEAR SHIFTING MECHANISM.
APPLICATION FILED JAN. 30, 1914. RENEWED MAY 16, 1917.

1,296,483.

Patented Mar. 4, 1919.
3 SHEETS—SHEET 3.

WITNESSES:
M. A. Schubler
J. R. Langley

INVENTOR
Frank Conrad
BY
Wesley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,296,483. Specification of Letters Patent. Patented Mar. 4, 1919.

Application filed January 30, 1914, Serial No. 815,356. Renewed May 16, 1917. Serial No. 169,096.

*To all whom it may concern:*

Be it known that I, FRANK CONRAD, a citizen of the United States, and a resident of Pittsburgh, in the county of Allegheny and State of Pennsylvania, have invented a new and useful Improvement in Gear-Shifting Mechanism, of which the following is a specification.

My invention relates to gear shifting mechanisms, and it has particular reference to mechanisms for controlling the speed ratios employed in the transmission gearing of automobiles or other motor vehicles.

My invention has for one of its objects to provide a simple and effective means for controlling the transmission gear mechanism of a motor vehicle by the operation of the usual clutch pedal or lever.

A second object of my invention is to provide a safety device which insures that the shifting mechanism is operative to shift the gear wheels of the transmission mechanism into and out of mesh only when the vehicle engine is disengaged from the transmission gearing.

A further object of my invention is to provide a means for controlling the connection of the clutch pedal to the shifting mechanism, whereby these parts may be connected automatically upon the actuation of any one of several push buttons which correspond to the various speeds.

In the operation of gear shifting mechanisms, it is highly essential that the engine be disconnected from the transmission mechanism while changes in speed ratio are effected in order that damage to the gear wheels may be avoided. In case the clutch pedal is used as the actuating member, as in the present invention, it is necessary to provide means for insuring this sequence of operation.

When a gear wheel has been shifted into mesh with a coacting gear wheel, it is desirable that the shifting mechanism be returned without delay to its normal position in order that it may be ready, without loss of time or the requirement of additional movements, for succeeding operations.

I have provided an arrangement which comprises, broadly, an electrically controlled mechanism for shifting the gear wheels of the transmission gearing to produce the desired speed ratio between the driving and the driven parts. A set of push buttons, located near the vehicle seat, enables the operator to select, in advance, the gear wheels to be shifted. The usual clutch pedal is automatically connected to the shifting mechanism only after one of the push buttons has been actuated and the pedal has been actuated beyond the point at which the clutch is disengaged. A single magnet, which controls the connection of the clutch pedal to the shifting mechanism, may be energized by any one of the several push buttons. The connection cannot be broken, however, until the shifting mechanism has been returned to its normal position, even though the controlling magnet be deënergized.

Figure 2:
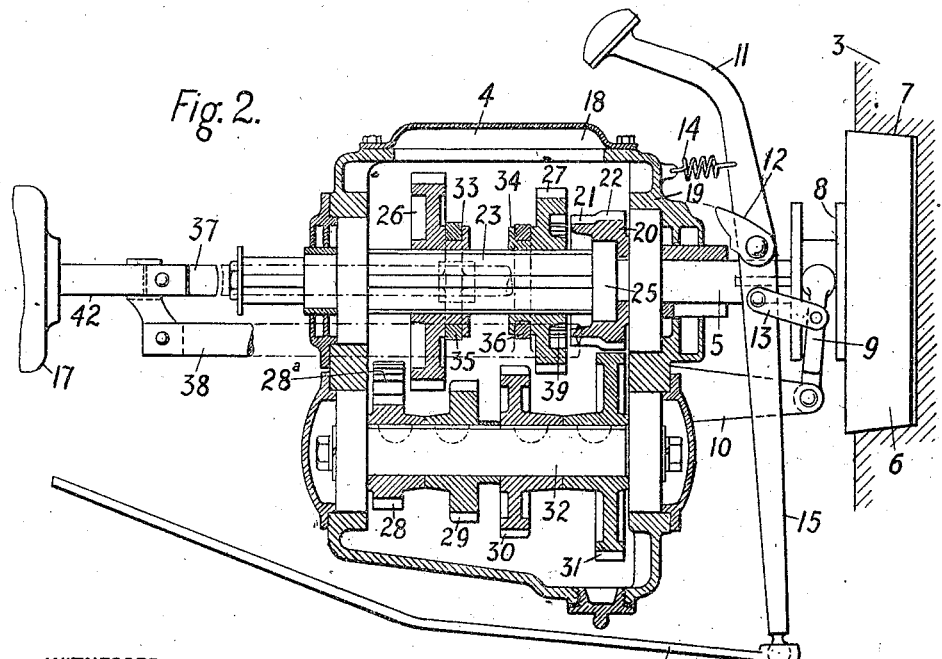
Figure 7:
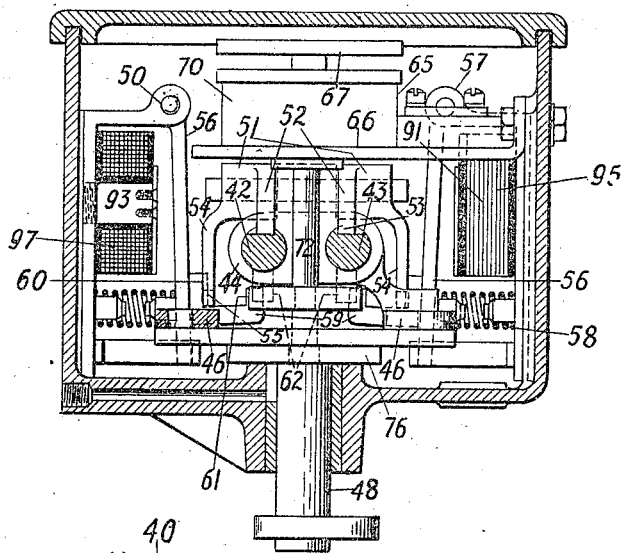
Figure 8:
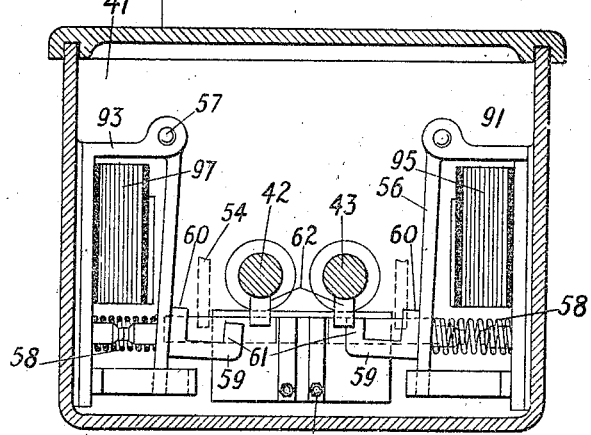
Figure 9:
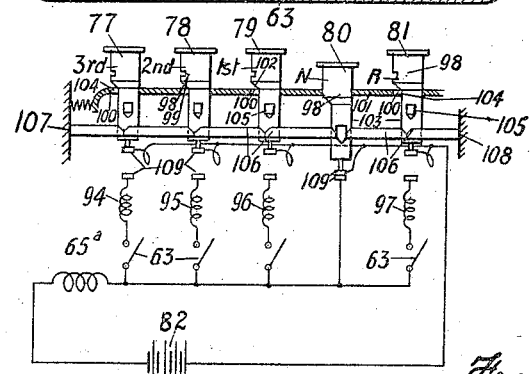

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a plan view of the gear shifting mechanism. Fig. 4 is a view in longitudinal section of the mechanism of Fig. 3. Figs. 5 and 6 are views of details. Fig. 7 is a sectional view of the mechanism of Fig. 3. Fig. 8 is a view, in section, on line VIII—VIII of Fig. 3. Fig. 9 is a diagrammatic view of the electrical circuits employed in connection with my invention and of the mechanism for controlling a set of push buttons that control the circuits.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 formed in the fly wheel 3. The clutch member 6 is provided with an integral grooved collar 8 to be engaged by a yoke member 9 that has a pivotal support upon a bracket 10. A pedal 11, that is adapted to be operated by the foot of the operator, has a pivotal support upon a lug 12 and is connected by a link 13 to the yoke member 9. A spring 14, that is attached at one end to a suitable stationary part, normally retains the clutch pedal 11 in its rearward position with the clutch member 6 engaging the member 7 in the fly wheel 3. The clutch pedal 11 is provided with an extended portion 15 that is connected by a link 16 to a gear shifting mechanism indicated broadly at 17.

The transmission mechanism 4 forms no part of my invention but is combined therewith, so that a description thereof is desirable in order to explain the operation of the gear shifting mechanism. The shaft 5, which is connected to the engine clutch member 6, extends into the transmission casing 18 through an end wall 19 and has a bearing therein. A gear wheel 20, having two sets of gear teeth 21 and 22, is mounted upon the shaft 5 within the casing 18. A transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31 that are fixed upon a counter shaft 32 and an idler gear wheel 28$^a$ that is in mesh with the gear wheel 28.

The gear wheel 31 is always in mesh with the gear teeth 22 to establish a fixed speed ratio between the shafts 5 and 32. The mechanism is arranged to provide three speeds in the forward and one in the reverse direction. The changes in speed ratio are controlled by the slidable gear wheels 26 and 27 which are respectively provided with integral grooved collars 33 and 34 to be engaged by yoke members 35 and 36. The yoke members 35 and 36 are respectively fixed upon shift rods 37 and 38 that are controlled by the gear shifting mechanism, as will be later described.

When the gear wheel 26 is in mesh with the gear wheel 29, the mechanism is in its first or low-speed position and the shaft 5 is connected through the gear teeth 22, gear wheel 31, counter shaft 32 and gear wheels 29 and 26 to the transmission shaft 23. For the second or intermediate speed, the gear wheel 27 is shifted into mesh with the gear wheel 30. For the third or high speed, the gear wheel 27 is shifted to the right until internal gear teeth 39, with which the gear wheel 27 is provided, mesh with the gear teeth 21. The shaft 5 is then directly connected to the transmission shaft 23 and the latter is driven at engine speed. For driving in the reverse direction, the gear wheel 26 is shifted into mesh with the gear wheel 28$^a$. The transmission mechanism is illustrated in its neutral or inoperative position in which the shaft 23 is not connected to the counter shaft 32.

Referring now to Figs. 3 to 8, inclusive, the gear shifting mechanism 17 comprises a housing or casing 40 having end walls 41 which provide bearings for two shift rods 42 and 43. The shift rods 42 and 43, which are slidable axially in their bearings, are respectively connected to the shift rods 37 and 38 of the transmission mechanism. Two blocks 44 and 45 are slidably mounted upon the shift rods 42 and 43. The blocks 44 and 45 are connected by links 46 to the oppositely extending arms of a lever 47. The oscillation of the lever 47 operates to slide the blocks 42 and 43 in opposite directions simultaneously. A rock shaft 48, which is actuated by the link 16 simultaneously with the operation of the clutch member 6, is adapted to be connected to the lever 47 under certain conditions, as will be later described.

Each of the shift rods 42 and 43 is provided with a longitudinal groove 49 having inclined shoulder portions 50 at each end. Dogs 51, that are pivotally mounted on opposite sides of the blocks 44 and 45, are provided with horizontally extending arms 52 having hook portions 53. Normally, the arms 52 are retained by springs 52$^a$ in the position shown in Fig. 4, with the hook portions 53 resting upon the bottoms of the grooves 49 in position to engage the shoulder portions 50. The dogs 51 are also provided with arms 54 that extend substantially vertically and each of them is provided with a horizontally extending portion 55.

Four stationary solenoids, or electromagnets of the clapper type, 90, 91, 92 and 93 are attached to the side walls of the housing 40 adjacent to the corners. The solenoids comprise coils 94, 95, 96 and 97, respectively, and each comprises an armature 56 having a pivotal support indicated at 57 and normally held outward by a spring 58. Each armature 56 is provided, upon its outer face, with a stop 59 of substantially U-shape. When the solenoids are deënergized, the vertical portions 60 of the corresponding stops 59 are in the paths of movement of the arms 54 of the coacting dogs 51, and the vertical portions 61 of the said stops are in the paths of movement of lugs 62.

The lugs 62, which are four in number, are located on the under sides of the shift rods 42 and 43, there being one on each rod upon each side of the blocks 44 and 45. When the blocks 44 and 45 are moved outwardly, and the arms 54 are engaged by the respective stops 59, the dogs 51 are rocked on their pivots and the arms 52 are raised upwardly from the grooves 49 so that the hook portions 53 cannot engage the shoulder portions 50. When one of the lugs 62 engages the corresponding stop 59, further movement of the corresponding shift rod in that direction is prevented.

When the solenoids are energized, the armatures are drawn inwardly and the stops 59 do not obstruct the outward movements of the several arms 54 and the lugs 62. The arms 54 then pass between the vertical portions 60 and 61 of the stops 59, the horizontal portions 55 of the arms being of sufficient length to retain the armatures in this position until the arms 54 are withdrawn. In the operation of the mechanism, which is later described, it is possible to energize only one of the solenoids at one time. Consequently, if one of them be energized, all of the arms 52 except that one corresponding to the energized solenoid will be raised to prevent the respective hook portions 53 from engaging the shoulder portions 50 with which they coact. The arm 52 that is not raised will engage its coacting shoulder portion 50, and a further movement of the sliding blocks 44 and 45 will cause a shifting of the rod 42 or of the rod 43, as the case may be, to shift the one or the other of the slidable gear wheels 26 and 27 in the same direction. Each of four self-closing limit switches 63, which are mounted in pairs in each end of the casing 40, comprises a movable member 64 which is actuated by one of the lugs 62 when the corresponding shift rod has reached the limit of its endwise movement. Each limit switch 63 controls the circuit of one of the solenoids, the arrangement being such that the circuit of the solenoid that has been energized to cause the shifting of one of the rods 42 and 43, when the blocks 44 and 45 are moved apart, is always broken by the corresponding limit switch that is opened at the end of the movement of the said rod which causes meshing of the transmission gear wheels.

The connection of the rock shaft 48 to the lever 47 is controlled by a mechanism comprising a solenoid 65 that is supported by a bracket 66 attached to the side walls of the housing 40. The solenoid 65 is provided with an armature 67 having the form of a disk and having a notch 68 in its periphery to coact with a curved stationary member 69 attached to the solenoid casing 70. The armature 67 is attached to a movable core member 71 having a rod 72 integral therewith. A spring 72ª normally holds the armature 67, the core member 71 and the rod 72 in their respective upper positions. A collar member 73, which is attached to the rod 72 at its lower extremity, is provided with pins 74 which project into corresponding holes 75 in the lever 47. The rock shaft 48 is provided with a fixed collar 76 having holes 76ª which register with the pins 74 and the holes 75 only when the clutch member 6 is disconnected from the member 7. The pins 74 project into the holes 76ª to connect the lever 47 and the shaft 48 when the solenoid 65 is energized and the corresponding parts are in register.

The notch 68 of the disk 67 registers with the stationary member 69 only when the several blocks 44 and 45 and dogs 51, that are connected by the lever 47 to the rod 72, are in their normal or neutral positions, as illustrated in Figs. 3 and 4. Consequently, the armature 67 is held downward by the stationary member 69, and the pins 74 are held within the holes 76 until the various parts are in their respective normal or neutral positions, regardless of the deënergizing of the coil 65ª.

The electrical circuits for controlling the gear shifting mechanism are illustrated in Fig. 9. The electrical connections comprise five parallel circuits which are respectively controlled by push buttons 77, 78, 79, 80 and 81. The several push buttons are designated according to the speed ratio controlled by them as 3rd, 2nd, 1st, N (neutral), and R (reverse), respectively. The push buttons 77, 78, 79 and 81 are so interlocked that only one button can be actuated at one time and this one remains closed until another button has been actuated. The button 80, or neutral button, is arranged to open as soon as released after actuation. The solenoid coils 94, 95, 96 and 97 are in series with the push buttons 77, 78, 79 and 81 respectively, and with the corresponding limit switches 63. The winding 65ª of the solenoid 65 is in series with each of the parallel circuits and with a battery 82.

The means employed to interlock the push buttons forms no part of the present invention, but a brief description of the same is desirable in order to explain the operation of my invention. Each push button, except the neutral button 80, is provided with a head portion 98 having a notch or groove 99 to be engaged by coacting portions 100 of a spring pressed slidable member 101 when the button has been depressed to bring the groove 99 into register with the portions 100. The several push buttons comprise inclined portions 102 and reduced portions 103 which project downwardly through slots 104 in the member 101, and are provided with lugs or bosses 105. The lugs 105 are wedge-shaped at one end to be inserted between the ends of bars 106 that are slidably mounted between two suitable stationary parts 107 and 108. The distance between the stationary parts 107 and 108 is equal to the sum of the lengths of the several bars 106 and the width of one of the lugs 105, thereby insuring that only one of the push buttons may be fully depressed at one time. When one of the buttons is depressed, the lug is inserted between the ends of the corresponding bars 106 and the groove 99 is engaged by the coacting portion 100 to lock it in its depressed position, with the corresponding contact members 109 engaged. When it is desired to close a second circuit, the corresponding button is pressed, and the inclined portion 102 engages the locking portion 100 to slide the member 101 to the left and thereby release the first push button before the lug 105 has engaged the corresponding bars 106. The neutral button 80, which is not provided with a groove 99, operates to release any other button which may have been locked in position to close its corresponding circuit.

It may be assumed that the transmission gear mechanism is in its neutral position, as illustrated in Fig. 2, and that the gear shifting mechanism is in its corresponding normal or neutral position, as shown in Figs. 3 and 4. It may be assumed, also, that the engine has been started and that the engine clutch 6 is disengaged. It is desirable to start the vehicle on first speed, and the push button 79 is accordingly pressed to close a circuit from the battery through the push button 79, coil 96 of the solenoid 92, limit switch 63 and solenoid coil 65$^a$ to the battery. The coil 96 is energized to draw the armature 56 of the solenoid 92 inwardly so that it cannot obstruct the movement of the corresponding dog 51 and lug 62. The coil 65$^a$ of the solenoid 65 is also energized to draw the armature 67, core member 71 and rod 72 downwardly to insert the pins 74 into the holes 76$^a$ and thereby connect the rock shaft 48 to the lever 47 when the several corresponding parts are in register. The clutch pedal 11, which, at the time of starting the engine, is in such a position that the engine clutch member 6 is disengaged from the member 7, is then pressed forwardly beyond this position. The link 16 then rotates the rock shaft 48 by means of a crank arm 82, and the lever 47 is thus operated to actuate the blocks 44 and 45 outwardly, the hook portions 53 of the arms 52 sliding along the grooves 49. When the hook portions 53 approach the shoulders 50, the arms 54, with the exception of that one coacting with the solenoid 92, engage the corresponding stops 59, and the dogs 51 are rocked about their pivots to raise the arms 52 from the grooves 49. Further movement of the blocks causes the dog 51 that is not rocked to engage the rod 42 and move it to the right (Figs. 3 and 4) to mesh the gear wheel 26 with the gear wheel 29.

When the gear wheels 26 and 29 are fully meshed, the lug 62 will have opened the corresponding limit switch 63 to break the circuit comprising the coil 96 and the coil 65$^a$. The operator then allows the spring 14 to retract the clutch pedal 11. The blocks 44 and 45 are then moved toward each other and the several dogs 51 are returned to their respective normal positions, the springs 52$^a$ drawing the arms 52 downwardly as soon as the hook portions 53 have passed the shoulders 50. The notch 68 of the disk 67 then registers with the stationary member 69, and the spring 72$^a$ moves the rod 72 and the pins 74 upwardly to disconnect the rock shaft 48 from the lever 47. The engine clutch is still out when the various parts are in their respective normal or neutral positions. Further return movement of the clutch pedal will effect the engagement of the engine clutch and the vehicle will be driven through the connections above described.

The circuit controlled by the push button 79 will remain open until another button has been pressed and the gears shifted from the first-speed position. The limit switch 63 will remain open until the shift rod 42 has been returned to withdraw the lug 62 from engagement with the switch member 64. The coil 65$^a$ cannot be energized until a push button other than 79 is pressed. It is, therefore, impossible to connect the lever 47 of the shifting mechanism to the clutch pedal 11 before a second button has been actuated. The clutch can be controlled as desired without in any way affecting the transmission gear mechanism.

When it is desired to change the speed ratio, as, for example to second speed, the push button 78 may be pressed at any time desired in advance of the actual change. The coil 95 of the solenoid 91 and the coil 65$^a$ will be energized to perform the same functions as described in connection with the corresponding parts when the push button 79 was closed. To effect the change to the desired speed, the operator presses the pedal 11 to disengage the engine clutch. The pins 74 connect the rock shaft 48 to the lever 47 at substantially the time of disengagement of the clutch. The rod 42 is in its shifted position and the shoulder 50 at the left end of the groove 49 is near the coacting hook portion 53 of the adjacent arm 52, so that a slight outward movement of the latter member will cause these parts to engage. The further actuation of the pedal 11 after the clutch is out, therefore, first operates to shift the rod 42 to its neutral position. At this point, all of the dogs 51, except that one controlled by the solenoid 91, have engaged their corresponding coacting stops 59, and the arms 52 are rocked out of engagement with the respective shoulders 50. But, since the coil 95 of the solenoid 91 is energized, the coacting dog 51 is still in operative position, and the further movement of the clutch pedal 11 causes the rod 43 to be shifted to the left and the gear wheel 27 to be shifted into mesh with the gear wheel 30. The coacting limit switch 63 will then be opened and the coils 95 and 65$^a$ be deënergized. The release of the pedal 11 first causes the blocks 44 and 45 and the dogs 51 to be returned to their respective normal positions, whereupon the pins 74 are withdrawn. The further movement of the pedal by the spring 14 effects the engagement of the engine clutch, and the vehicle will be driven at second speed. In the same manner, changes may be made to third speed or the direction of drive reversed by actuating the appropriate push buttons 77 and 81, respectively. It will, of course, be understood that, in order to reverse the direction of the vehicle, it is necessary to bring it to a stop before the clutch is thrown in.

When it is desired to return either of the shiftable gear wheels 26 and 27 to the neutral position, the neutral button 80 is closed to energize the coil 65$^a$. This action may occur regardless of the closure of any of the speed-controlling buttons 77, 78, 79 and 81. The clutch is disengaged as before, whereupon the lever 47 is actuated by the rock shaft 48 to shift the blocks 44 and 45 outwardly. The shifted rod is in a position to be engaged immediately by the appropriate dog 51 to return it to its normal or neutral position. When the dogs 51 reach the stops 59, all of the arms 52 are rocked out of the grooves 49, since none of the controlling solenoids 90, 91, 92 and 93 are energized. It is then impossible to shift the gear wheels until one of the buttons, other than the neutral button 80, is closed.

It will be noted that I have provided a gear shifting mechanism in which the usual clutch pedal is automatically connected to the gear wheel to be shifted only after the gear wheel has been selected by the operator and the engine has been disconnected from the driven parts. I have provided, also, a mechanism which insures the return of the shifting mechanism to its normal position after each shifting movement.

Other applications assigned to the assignee of the present application have been filed by other parties to cover features illustrated and described herein but not claimed, such applications being as follows: John E. Webster, Serial No. 810,814, filed Jan. 7, 1914, and Otto S. Schairer, Serial No. 808,735, filed Dec. 26, 1913.

I claim as my invention:

1. In a gear shifting mechanism, the combination with a shiftable gear wheel, of a clutch member, a pedal for controlling said clutch member, and electro-responsive means for connecting said pedal to said gear wheel when said clutch member is in an inoperative position.

2. In a gear shifting mechanism, the combination with a shiftable gear wheel, of a lever, and means for effecting the connection of said lever to said gear wheel when said lever is in a predetermined position and for maintaining said connection until said lever is again in the predetermined position.

3. In a gear shifting mechanism, the combination with a shiftable gear wheel, a pivotally mounted member, means for connecting said member to said gear wheel, a means comprising an electromagnet for controlling said connecting means.

4. In a gear shifting mechanism, the combination with a shiftable gear wheel, and a movable member connected thereto, of a pedal, means for connecting said pedal to said member, said means comprising coacting members that are in register only when said pedal is in a predetermined portion of its movement path and means tending to effect the connection of said coacting members before they are in register.

5. In a gear shifting mechanism, the combination with a shiftable gear wheel, of a clutch member, an actuating member connected to the clutch member, means for connecting said actuating member to said gear wheel, means for controlling said connecting means, said controlling means comprising an electromagnet and means for rendering said electromagnet ineffective except when said clutch member is in an inoperative position.

6. In a gear shifting mechanism, the combination with a shiftable gear wheel, of an actuating member, means for connecting said member to said gear wheel, means for controlling said connecting means, said controlling means comprising an electromagnet, a rotatable core member for said electromagnet and connected to said actuating member, a member on said core member that is provided with an aperture, and a stationary member which registers with said aperture only when said actuating member is in a predetermined position.

7. In a gear shifting mechanism, the combination with a shiftable gear wheel, of an actuating member, means for connecting said member to said gear wheel, and means for controlling said connecting means, said controlling means comprising an electromagnet having a rotatable core member and and armature provided with an aperture and connected to said core member, and a stationary member which coacts with said aperture.

8. In a gear shifting mechanism, the combination with a shiftable member, a lever, means for connecting said lever to said member, and means for controlling said connecting means, said controlling means comprising a plurality of push buttons and an electromagnet that is in series with each of said push buttons.

9. In a gear shifting mechanism, the combination with a shiftable member, and an actuating member therefor, of means for connecting said actuating member to said shiftable member, and means for controlling said connecting means, said controlling means comprising a plurality of push buttons arranged in parallel circuits and an electromagnet having a coil in series with each of said push buttons.

10. In a gear shifting mechanism, the combination with a shiftable member and an actuating member therefor, of means for selectively controlling the path of movement of said shiftable member, a clutch member and means for connecting said actuating member to said shiftable member when said controlling means has been actuated to select a change of position for said shiftable member and said clutch member has subsequently been actuated to an inoperative position.

11. In a gear shifting mechanism, the combination with a shiftable member and an actuating member therefor that is normally disconnected therefrom, of means for selectively controlling the path of movement of said shiftable member, and means for connecting said actuating member to said shiftable member when said controlling means has been actuated to select a change of position for said shiftable member, said connecting means being operable independently of the position of said shiftable member.

12. In a gear shifting mechanism, the combination with a plurality of shiftable gear wheels, and an actuating member therefor, of means for selectively controlling the path of movement of said gear wheels, a clutch member and means for connecting said actuating member to said gear wheels upon the successive actuation of said controlling means to select a change of position for one of said gear wheels and the actuation of the clutch member to a predetermined position.

13. In a gear shifting mechanism, the combination with a shiftable member, and an actuating member normally disengaged therefrom, of means comprising a plurality of electric switches for selectively controlling the path of movement of said shiftable member, and means for connecting said members when one of said switches has been actuated to select a change of position for said shiftable member.

14. In a gear shifting mechanism, the combination with a shiftable member and an actuating member therefor that is normally disconnected therefrom, of means comprising a plurality of electric switches for selectively controlling the path of movement of said shiftable member and for simultaneously controlling the connection of said actuating member to said shiftable member.

15. In a gear shifting mechanism, the combination with a shiftable member and an actuating member therefor that is normally disconnected therefrom, of means comprising a plurality of push buttons for selectively controlling the path of movement of said shiftable member, and means controlled by said push buttons for connecting said actuating member to said shiftable member.

16. In a gear shifting mechanism, the combination with a transmission mechanism comprising shiftable gear wheels, and means for shifting said gear wheels, of means comprising a plurality of push buttons for selectively controlling the path of movement of said gear wheels, and means for connecting said shifting means to said gear wheels only upon the actuation of one of said push buttons to select a change in position for one of said gear wheels.

17. In a gear-shifting mechanism, the combination with a shiftable member, of actuating means therefor comprising a clutch pedal lever, and electro-responsive means for controlling the effect of the operation of said pedal lever.

18. In a gear-shifting mechanism, the combination with a shiftable member, of actuating means therefor comprising a clutch pedal lever, and electro-responsive means for selectively controlling the effect of the operation of said pedal lever.

In testimony whereof, I have hereunto subscribed my name this 24th day of Jan., 1914.

FRANK CONRAD.

Witnesses:
 WILLIAM BRADSHAW,
 B. B. HINES.